United States Patent
Le Bastard et al.

(10) Patent No.: US 7,711,456 B2
(45) Date of Patent: May 4, 2010

(54) DEVICE FOR SAFELY OPERATING A FLIGHT CONTROL ACTUATOR OF AN AIRCRAFT

(75) Inventors: Jean-Claude Le Bastard, Toulouse (FR); Jean Foisneau, Toulouse (FR)

(73) Assignee: Thales (FR)

( * ) Notice: Subject to any disclaimer, the term of this patent is extended or adjusted under 35 U.S.C. 154(b) by 0 days.

(21) Appl. No.: 12/097,344

(22) PCT Filed: Dec. 13, 2006

(86) PCT No.: PCT/EP2006/069636

§ 371 (c)(1),
(2), (4) Date: Nov. 17, 2008

(87) PCT Pub. No.: WO2007/068711

PCT Pub. Date: Jun. 21, 2007

(65) Prior Publication Data

US 2009/0157238 A1    Jun. 18, 2009

(30) Foreign Application Priority Data

Dec. 13, 2005    (FR)    ................... 05 12605

(51) Int. Cl.
G01C 23/00    (2006.01)
(52) U.S. Cl. ........................................... 701/3
(58) Field of Classification Search ............ 701/1, 701/3, 11; 244/75.1, 76 R, 177–182, 194–197, 244/99.2
See application file for complete search history.

(56) References Cited

U.S. PATENT DOCUMENTS

2004/0140785 A1 * 7/2004 Szulyk ..................... 318/563

FOREIGN PATENT DOCUMENTS

| EP | 0628897 | 12/1994 |
| EP | 1495944 | 1/2005 |
| FR | 2850210 | 7/2004 |
| WO | WO03/003131 | 1/2003 |

OTHER PUBLICATIONS

Unitrode Integrated Circuits Corporation (UICC): "Product & Applications Handbook 1995-1996." Jan. 1995, Unitrode Integrated Circuits Corporation (UICC), Merrimack, NH, USA, XP002402891, pp. 7-69-7-74 and 10-97-10-101.

* cited by examiner

*Primary Examiner*—Kim T Nguyen
(74) *Attorney, Agent, or Firm*—Lowe Hauptman Ham & Berner, LLP

(57) ABSTRACT

The field of the invention is that of safe devices for operating the actuators of aircraft and more specifically the flight control actuators of a helicopter. The invention consists of a safe control device for commanding an actuator (15) movement comprising at least two independent calculation chains (120), (130), a circuit for mixing instructions (65) and a power stage (88), each calculation stage delivering a direction of movement instruction and a speed of movement instruction for the actuator, the instructions being transmitted to the circuit for mixing instructions (65) in order to generate a primary movement command for the actuator comprising modulated pulse trains, the power stage receiving the primary movement command and delivering a power movement command to the actuator (15). According to the invention, the circuit for mixing instructions (65) compares the direction of movement instructions and the speed of movement instructions in pairs in order to generate the primary movement command for the actuator.

6 Claims, 4 Drawing Sheets

DEVICE FOR SAFELY OPERATING A FLIGHT CONTROL ACTUATOR OF AN AIRCRAFT

CROSS-REFERENCE TO RELATED APPLICATIONS

The present Application is based on International Application No. PCT/EP2006/069636, filed on Dec. 13, 2006, which in turn corresponds to French Application No. 05 12605, filed on Dec. 13, 2005, and priority is hereby claimed under 35 USC §119 based on these applications. Each of these applications are hereby incorporated by reference in their entirety into the present application.

TECHNICAL FIELD

The field of the invention is that of safe devices for operating the actuators of aircraft and more specifically the flight control actuators of a helicopter.

BACKGROUND OF THE INVENTION

In order to stabilize and steer his aircraft, a helicopter pilot manually activates piloting means (cyclic stick, collective pitch and pedals) in order to act on the piloting axes of the helicopter (main rotor or tail rotor). A lateral or longitudinal movement of the cyclic stick makes it possible to act respectively on the lateral or longitudinal axes of the helicopter by modifying the incidence of the main rotor blades. The collective pitch makes it possible to adapt the engine power to the flight conditions by modifying the incidence of the main rotor blades and makes it possible to modify the ascent speed. The pedals make it possible to orient the nose of the helicopter by modifying the incidence of the tail rotor blades. The movement of the piloting means is transmitted to the piloting axes by means of mechanical transmission systems which are constituted by various mechanical relays. The assembly constituted by a piloting means and an associated transmission system constitutes a flight control linked with the piloting axis in question. The end of the flight control in contact with the piloting means is called the output end of the flight control.

Helicopters are often equipped with automatic piloting equipment which acts on the flight controls, under the authority of the pilot, in order to carry out two main tasks: a first task of assisting the pilot and a second task of automatic piloting.

When it is assisting the pilot in the manual control of his helicopter, the automatic piloting equipment makes it possible, on the one hand, to dampen the movements of the machine in order to facilitate its control by the pilot and, on the other hand, to maintain the current flight configuration (lateral and longitudinal attitudes and heading) thus making it possible for the pilot to release the piloting means momentarily without going into a flight configuration which would be dangerous.

When it is in automatic piloting mode, the automatic piloting equipment makes it possible to slave one or more flight parameters (lateral speed, heading, navigation, etc) to one or more instruction values chosen previously by the pilot.

In order to act on a flight control, the automatic piloting equipment uses actuators. Among these actuators are distinguished actuators called "trim actuators" and actuators called "series actuators". The "trim actuators" are actuators, with or without return force, which have a large travel covering all of the positions of the flight controls but whose response time is relatively slow. They are generally of the rotary type and are placed in parallel with the flight controls.

"Series actuators" are mechanical actuators which are placed in series with the flight controls, they comprise a body and an output shaft, they are generally of the endless screw/nut type and have reduced authority and a short response time. They convert an electrical command into a movement of translation of their output shaft with respect to their body. "Series actuators" are called "mechanically irreversible". That is to say they deform solely when an electrical command is applied to them. In particular, when the automatic piloting equipment is not operating, the "series actuators" are without effect on the control of the control of the helicopter. A neutral position of a series actuator corresponds to the position where the free end of its output shaft is at mid-travel.

For safety reasons, the series actuators are duplicated in the flight controls in order to provide redundancy and the same thing applies to the calculating chains of the trim actuators.

The low authority of a series actuator necessitates a servo-control of the movement of the trim actuator so that the series actuator is at all times close to its neutral position. A control device defines the command to transmit to the trim actuator. In general this command is electrical and comprises information on the direction of the rotational movement and on its desired speed. A control device comprises two calculation chains, each fed with data on the position of the output shaft of one of the series actuators and a circuit for mixing instructions which generates a command from the instructions coming from the different calculation chains. In the prior art, a first chain called "supervision" delivers only a direction of movement instruction, a second chain called "control" provides both a direction of movement instruction and a speed instruction. In order to generate a primary movement command, the circuit for mixing instructions controls only the direction of movement: it prohibits a movement of the trim actuator in a direction which is not in accordance with the instruction from the supervision chain. Such a control device architecture is sufficient for the piloting of aircraft that are not very reactive.

When a sudden failure of the "control" calculation chain occurs, during a transient period starting from the instant when the failure is initiated up to the instant when the "supervision" chain modifies the direction of movement of the actuator instruction, an incorrect command arrives at the actuator and acts upon its movement. Certain aircraft models, and this is the case of certain helicopters, are very reactive and even relatively unstable, and a failure of this type on such an aircraft, particularly if the incorrect command is of high amplitude, for example a roll command at a speed of 30 degrees per second, can prove to be dramatic to the pilot of the aircraft, since the pilot's reaction time is too slow to allow him to compensate, by himself, for the effects of the incorrect command during this transient period.

SUMMARY OF THE INVENTION

The purpose of the invention is to overcome this disadvantage. More precisely, its purpose is to propose a safe control device delivering a command for the movement of a trim actuator, generated and controlled on the basis of direction and speed instructions generated independently by two independent calculation chains and compared after a previous temporal synchronization.

More precisely, the subject of the invention is a device for safely commanding an actuator movement comprising at least two independent calculation chains, a circuit for mixing instructions and a power stage, each calculation chain delivering a direction of movement instruction and a speed of movement instruction for the actuator, the instructions being transmitted to the circuit for mixing instructions in order to generate a primary actuator movement command comprising modulated pulse trains, the power stage receiving the primary movement command and delivering a power movement command to the actuator, wherein the circuit for mixing instructions compares the direction of movement instructions and the speed of movement instructions in pairs in order to generate the primary actuator movement command.

A first advantage of a safe control device according to the invention is that it eliminates the transient period during which a fault in the "command" chain acts on the movement of the actuator. A demonstration of this functional feature to aeronautical certification authorities can advantageously be carried out on the ground, in the form of a software demonstration. In this way having recourse to in-flight tests which are difficult and dangerous for the pilot and which are moreover extremely costly is avoided.

The safe control device according to the invention is compatible with functioning coupled with a power stage whose architecture is of the H bridge type, which is known in the prior art, for generating a power command from a primary low-voltage command. This compatibility facilitates integration at low cost of a safe control device according to the invention in a large number of existing aircraft equipped with such power stages.

Moreover, the hardware architecture of a safe control device according to the invention is close to that of devices of the prior art. It is distinguished from them principally by the addition of an exchange device between the calculation chains for the synchronization of the speed instructions delivered to the circuit for mixing instructions. The exchange device has very low mass. The safe control device according to the invention does not penalize the mass balance of the aircraft equipped with it.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

In all of the figures, the same elements are indicated by the same references.

DETAILED DESCRIPTION OF THE INVENTION

Figure 1:
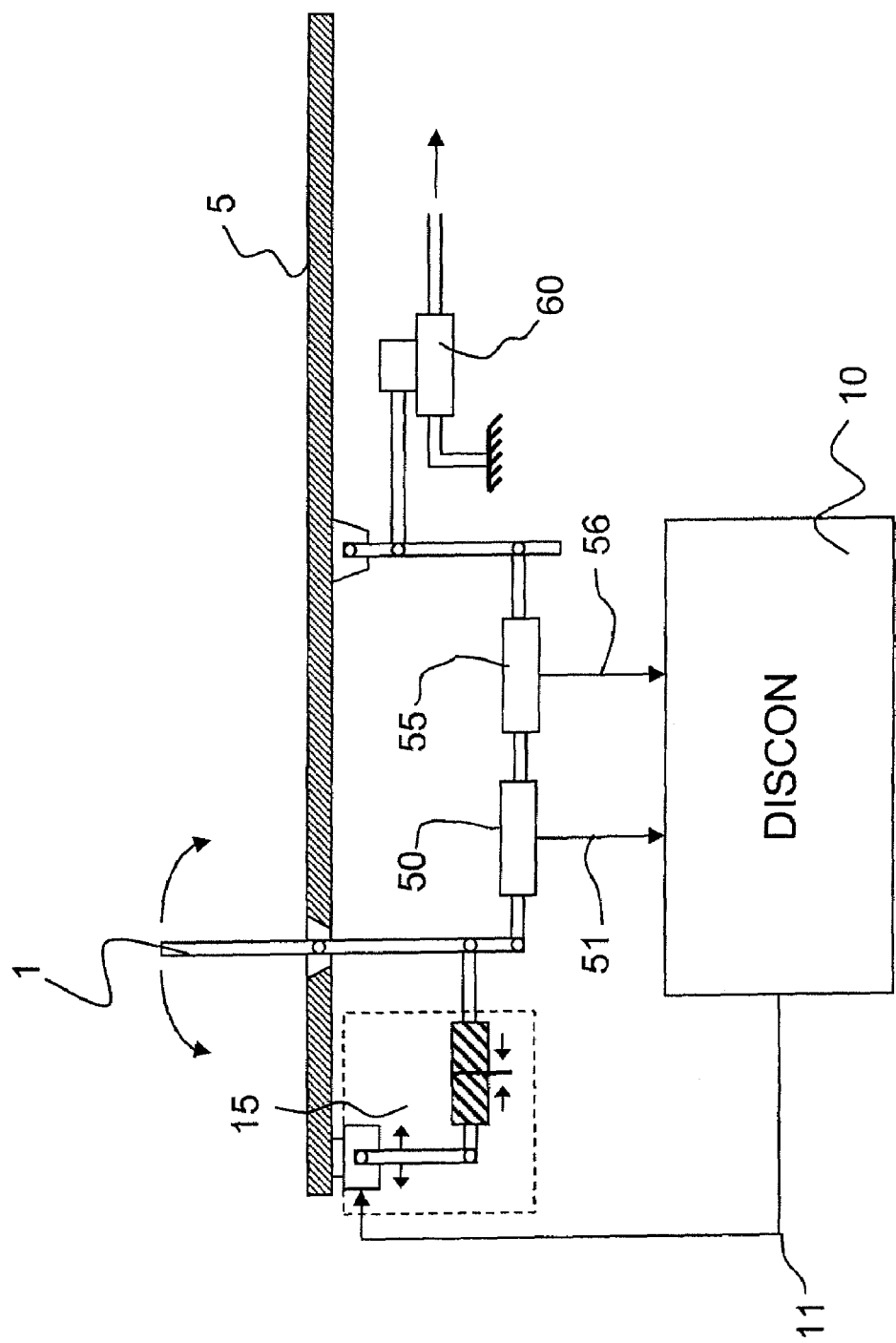
FIG. 1 partially represents a helicopter cockpit.

FIG. 1 is a partial cross-section of a helicopter cockpit. A flight control mechanically connects manual piloting means, for example pedals or, in this case, a cyclic stick 1, placed in a cockpit of the helicopter at one of the piloting axes of the helicopter, for example an element for controlling the incidence of the blades of a rotor of the helicopter. The cyclic stick can be operated by a pilot of the helicopter. The pilot of the helicopter and the piloting axis are not shown in the figure.

When a pilot inclines the cyclic stick 1, a movement in one dimension is transmitted to the flight control. The movement of the flight control is transmitted to a servo-motor 60, which assigns a proportional movement to the elements for controlling the incidence of the blades of the helicopter.

A trim actuator 15 is generally anchored to the floor 5, at the junction of the cyclic stick and the flight control linkage. The trim actuator 15 is generally of the rotary type and is mounted at the level of mechanical articulations, it moves an anchoring point of the return force on the cyclic stick 1 and thus determines a neutral position of the cyclic stick 1 close, at all times, to that in which it was placed by the pilot in order to avoid any sudden variation in the control intended for the piloting axes. The action of the trim actuator 15 produces a movement of the flight control or the same type as that imparted by the cyclic stick.

The movement of the trim actuator is controlled by a control device DISCON 10, which sends an electrical movement command 11. The movement command 11 of a trim actuator 15 is generated by the control device DISCON, for example from measurements of the extension of the series actuators 50, 55, which are placed in series on the flight control.

In permanent conditions, the series actuators 50, 55 are in the neutral position. They leave this position each time the automatic piloting device commands a significant and fast change of position. The series actuators allow the automatic piloting device to obtain the positions desired for the flight control before the trim actuators 15 have reached their required positions. After the flight control has obtained the desired position, the associated series actuators 50, 55, having left their neutral position, return to it progressively as the trim actuator 15 reaches its required position.

Figure 2:
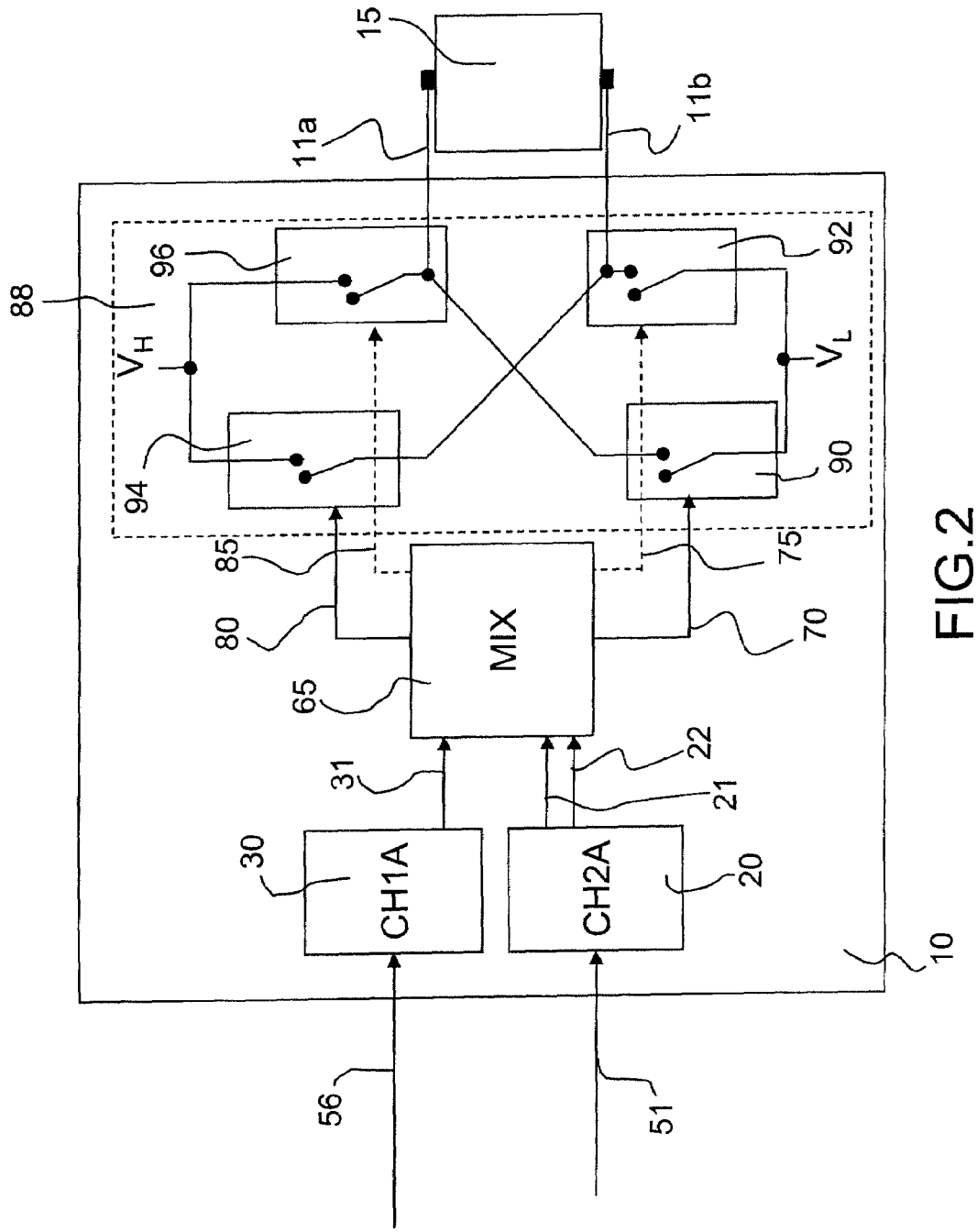
FIG. 2 is a diagrammatic representation of a control device according to the prior art for controlling an actuator movement.

FIG. 2 gives details of the content of a control device DISCON 10 according to the prior art generating movement instructions for the trim actuator 15. The trim actuator can be in motion in one dimension (and therefore two opposite directions) or can remain immobile. The trim actuator is fed with pulses of amplitude $V_H$-$V_L$ or $V_L$-$V_H$ delivered by a power stage.

The control device 10 comprises:
two calculation chains CH1A, 30, CH2A 20;
a circuit for mixing instructions MIXCOMA, 65;
a power stage.

In the following text, the discrete values are two-state Boolean values, for example TTL levels:
a high state corresponding to an activation of the discrete value;
a low state corresponding to a deactivation of the discrete value.

A first calculation chain CH1A 30, called the "supervision chain" receives a measurement 51 of extension of a series actuator 50, and generates a first direction of movement instruction 31 for the trim actuator 15. The chain CH1A activates a discrete value WAY1#1 if a first direction of movement is requested and deactivates this discrete value if the first direction is not desired. At the same time, the chain CH1A activates a discrete value WAY2#1 if a second direction of movement is requested and deactivates this discrete value if the second direction is not desired.

A second calculation chain CH2A, 20 called the "control chain", receives a measurement 56 of the extension of the series actuator 55 and generates a second direction of movement instruction 21, and a speed of movement instruction 22 for the trim actuator 15. The chain CH2A activates a discrete value WAY1#2 if the first direction of movement is requested and deactivates this discrete value in the opposite case. At the same time, the chain CH2A activates a discrete value WAY2#2 if the second direction of movement is requested and deactivates this discrete value if the second direction of movement is not requested.

The speed of movement instruction delivered by the chain CH2A for activating the trim actuator takes the form of two discrete values SPEED1#2, SPEED2#2, assigning a speed of movement of the actuator 15 in the first direction and a speed of movement of the actuator in the second direction respectively. The discrete value SPEED1#2 is deactivated if WAY1#2 is deactivated and the discrete value SPEED2#2 is deactivated if WAY2#2 is deactivated.

The calculation chain CH2A comprises a calculating algorithm for calculating, as a function of the sought speed of movement, the temporal form of a train of pulses modulated as a function of the desired speed. The algorithm determines, in particular:

a period $t_p$ during which one of the instructions SPEED1#2 or SPEED1#2 is at the high level. $t_p$ corresponds to the duration of a movement of the actuators in the first direction or in the second direction respectively, at a prefixed speed, and a period $T_p$ of pulses SPEED1#2 and SPEED1#2.

The calculation chains CH1A and CH2A generating instructions 31, 21 and 22 are independent from each other.

The circuit for mixing instructions, MIX 65, determines from the instructions delivered by the calculation chains CH1A and CH1B a primary movement of the actuator command which is transmitted to the power stage in the form of four discrete values HW_WAY1, HW_WAY2, HW_SPEED1, HW_SPEED2. The equations relating the instructions and the primary movement command are explained below. The "AND" operator corresponds to a logical "AND".

HW_WAY1=WAY1#2,

HW_WAY2=WAY2#2,

HW_SPEED1=SPEED1#2 AND WAY1#1

HW_SPEED2=SPEED2#2 AND WAY2#1

The power stage 88 has, for example, an architecture of the "H bridge" type, it comprises four relays 90, 92, 94, 96; and two voltage sources $V_H$ and $V_L$, where $V_L<V_H$. Each of the discrete values 70, 75, 80, 85 addresses one of the four relays 90, 92, 94, 96 of the power stage 88: the discrete value HW_SPEED1, 70 addresses a relay 90, the discrete value HW_SPEED2, 75 addresses a relay 92, the discrete value HW_WAY1, 80 addresses a relay 94, the discrete value HW_WAY2, 85 addresses a relay 96. The relays are "conducting" when the discrete value addressing them is activated and "non-conducting" when that discrete value is deactivated. A power command 11a, 11b is generated by the power stage and is sent to the trim actuator 15.

Figure 3:
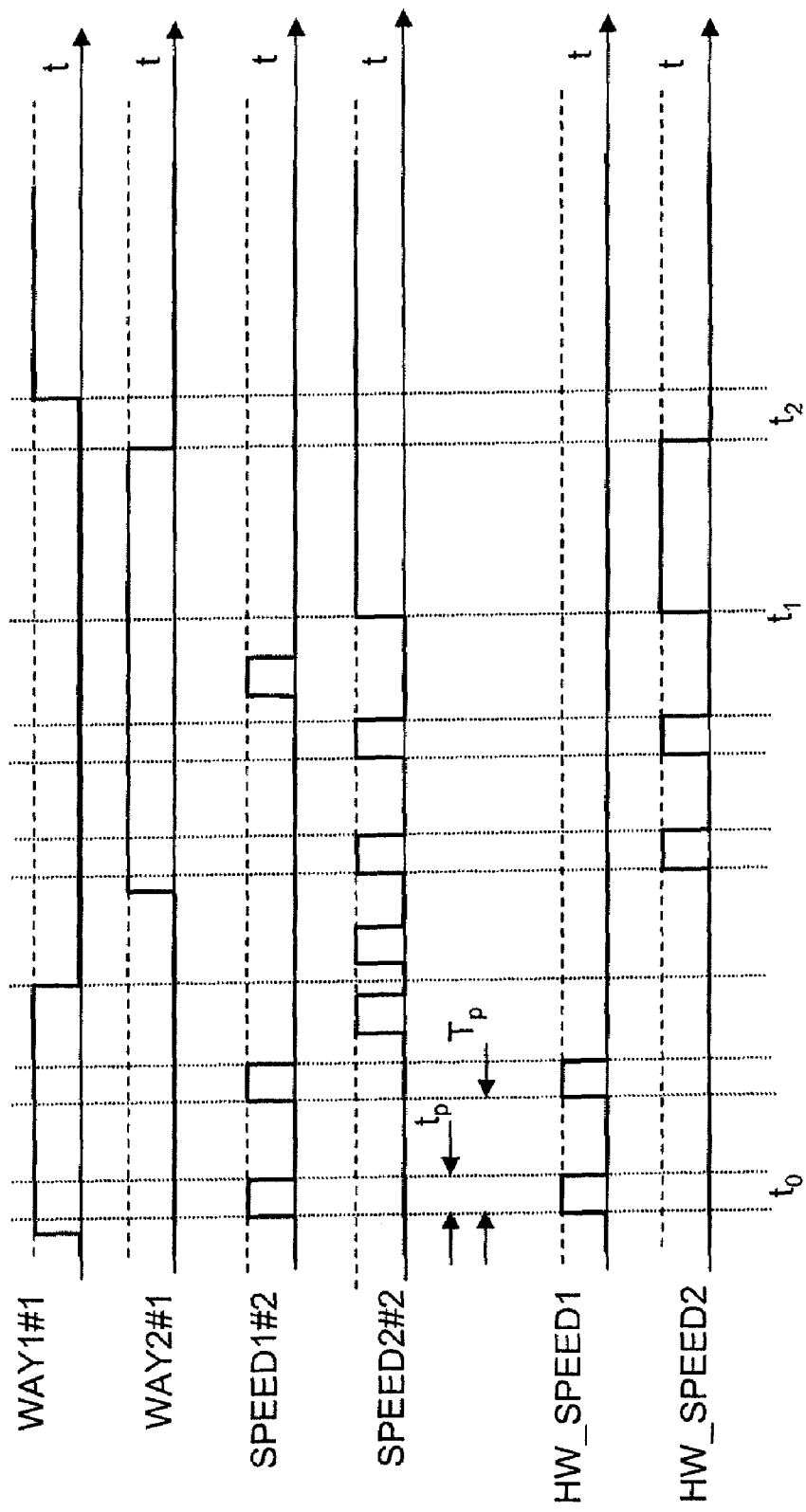
FIG. 3 is a timing diagram of control signals of a control device according to the prior art.

FIG. 3 shows timing diagrams which illustrate the operating logic of the control device of the prior art as well as one of its operational limits.

In a first and in a second timing diagram, the change in the values taken by the discrete values WAY1#1 and WAY2#1 over time is plotted.

In a third and in a fourth timing diagram the change in the values taken by the discrete values SPEED1#2 and SPEED2#2 over time is plotted.

Finally, in a fifth and in a sixth timing diagram, the change in the values taken by the discrete values HW_SPEED1#2 and HW_SPEED2#2 over time is plotted.

From a time $t_0$ to a time $t_1$, the discrete values HW_SPEED1 and HW_SPEED2 constituting the primary movement command conform with the movement instructions.

When, at time $t_1$, a failure occurs on the calculation chain CHA2, for example the discrete value SPEED2#2 becomes locked, in an unexpected manner, at the high level, the trim actuator 15, operates with a continuous movement until t2, t2 being the time at which the chain CHA2 deactivates the discrete value WAY1#2. The longer the transient period separating the time $t_2$ from the time $t_1$ is, the longer it is possible for the consequences of the failure to manifest in a serious manner for the pilot and his aircraft, notably in the situation in which the actuator in question is associated with a flight control and acts on the roll of the helicopter.

Figure 4:
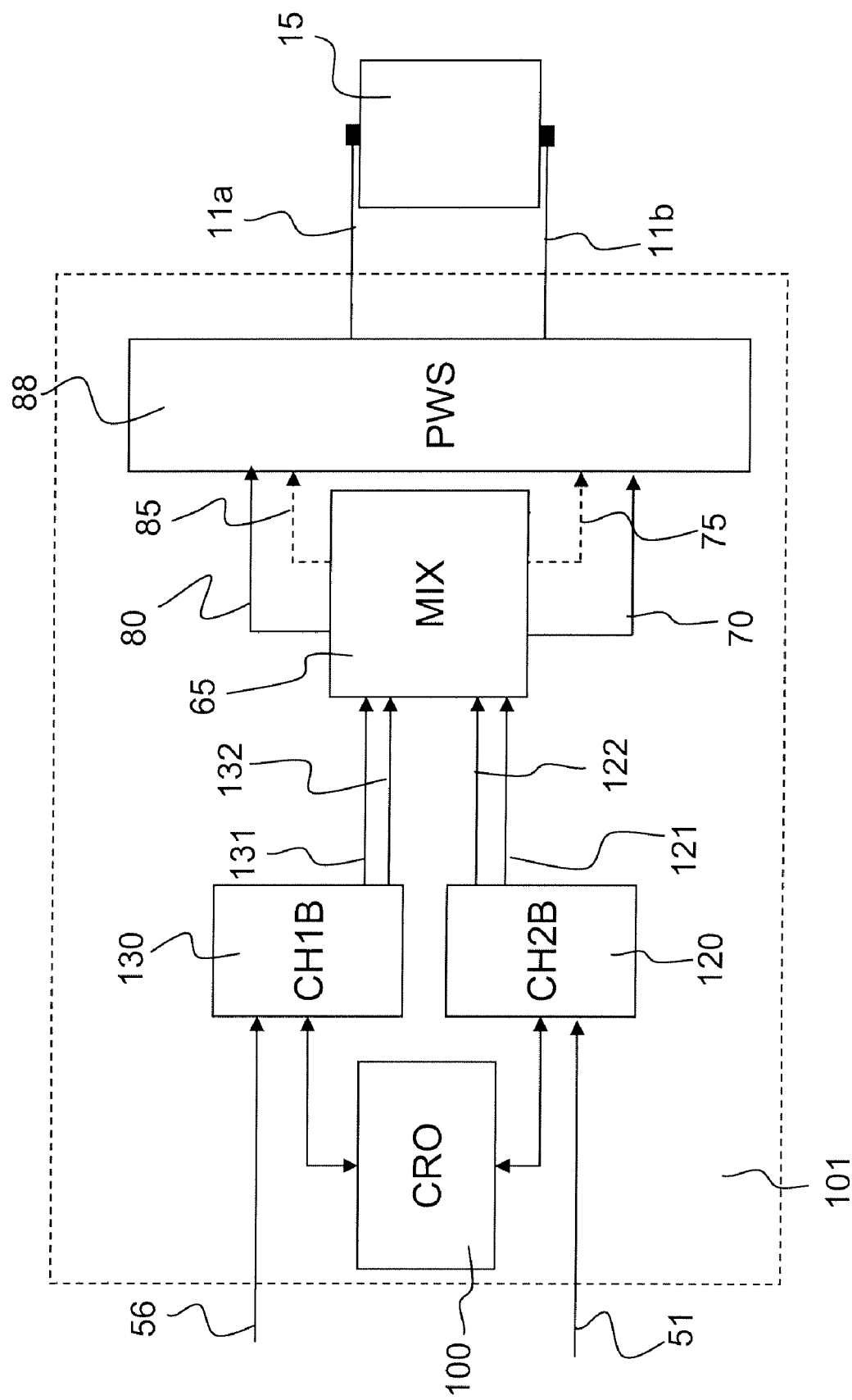
FIG. 4 is a diagrammatic representation of a control device according to the invention for controlling an actuator movement.

FIG. 4 shows a control device according to the invention which reduces the effect of a failure such as described previously in FIG. 3. The control device 101, made safe according to the invention, comprises:

two calculation chains CH1B, 130, CH2B 120;

a circuit for mixing instructions MIX, 65;

a power stage, PWS, 88;

an inter-chain dialog circuit CRO, 100.

Each calculation chain CH1B, CH2B, 120, 130 generates a direction of movement instruction 121, 131 and a speed of movement instruction 122, 132, independently with respect to the other chain, from, for example, information 51, 56 coming from the extension of series actuators 50, 55.

Advantageously, the safe control device according to the invention 101 furthermore comprises an exchange module 100 for exchanging information between the calculation chains 120, 130 and the information allows a temporal synchronization of the speed instructions before they are delivered to the circuit for mixing instructions, 65.

Information is exchanged by the calculation chains CH1B, CH2B, for example verifications of end of generation of the instructions 121, 131, 122, 132. Each calculation chain CH1B, CH2B is fed with information 51, 56 appropriate to it and operates at its own rate. An example of temporal synchronization consists in a start of transmission of the instructions to the circuit for mixing instructions on condition that each of the chains CH1B, CH2B has finished generating its instructions 121, 131, 122, 132, each instruction 121, 131, 122, 132 taking the form of two discrete values. Thus, the calculation chain CHA2 delivers four discrete values: WAY1#1, WAY2#1, SPEED1#1, SPEED2#1, and the calculation chain CHB2 delivers four discrete values: WAY1#2, WAY2#2, SPEED1#2, SPEED2#2.

When it receives the previously synchronized instructions 121, 131, 122, 132 coming from the calculation chains CH1B, CH2B, the circuit for mixing instructions MIX, 65 generates a primary movement command 70, 75, 80, 85.

The equations relating the movement instructions and the constituents of the primary movement command 70, 75, 80,

85 are explained below. The "AND" operator corresponds to a logical "AND".

HW_WAY1=WAY1 #2,

HW_WAY2=WAY2#2,

HW_SPEED1=SPEED1#2 AND SPEED1#1

HW_SPEED2=SPEED2#2 AND SPEED2#1

The power stage PWS, 88, for example having an architecture of the "H bridge" type, delivers the power command 11a, 11b when it is fed with a primary movement command 70, 75, 80, 85 which is perhaps transmitted in this case in the form of four discrete values HW_WAY1, HW_WAY2, HW_SPEED1, HW_SPEED2 each addressing one of the four relays of the power stage 88.

Advantageously, the power stage 88 comprises a power H bridge, and two voltage sources supplying different voltages, the power H bridge comprising four relays 90, 92, 94, 96, individually addressable by discrete values, the set of discrete values constituting the primary command 70, 75, 80, 85, a relay being able to be conducting or non-conducting depending on the value of the discrete value addressing it.

The trim actuator 15 is put into motion on receiving a power movement command 11a, 11b at its terminals.

One result of this calculating method is that:

Advantageously, when at least two different direction of movement instructions 121, 131 are feeding the circuit for mixing instructions 65, the primary command 70, 75, 80, 85 which the circuit delivers to the power stage 88 corresponds to a zero movement, Advantageously, when at least two speed of movement instructions 122, 132 feeding the circuit for mixing instructions 65 are different, the primary command 70, 75, 80, 85 which the circuit for mixing instructions (65) delivers to the power stage 88 corresponds to a movement whose speed is the lowest of those assigned by the speed instructions 122, 132.

In this way, the effects of a sudden failure of one of the two calculation chains CH1B, CH2B are limited.

Advantageously, the actuator 15, is a full authority rotary type actuator.

Advantageously, the actuator 15 is a trim actuator which is used for acting on the manual piloting means 1 of an aircraft.

The manual piloting means being, for example, pedals or a cyclic stick.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A safe control device for commanding an actuator movement comprising:
   at least two independent calculation chains,
   a mixing instructions circuit; and
   a power stage,
   wherein each calculation chain is configured to deliver a direction of movement instruction and a speed of movement instruction for the actuator, the instructions being transmitted to the mixing instructions circuit in order to generate a primary actuator movement command comprising modulated pulse trains, the power stage receiving the primary movement command and delivering a power movement command to the actuator, the mixing instructions circuit configured to compare the direction of movement instructions and the speed of movement instructions in pairs in order to generate the primary actuator movement command,
   the safe control device further comprising an exchange module configured to exchange information between the calculation chains, wherein the information exchanged allows a temporal synchronization of the speed instructions before the speed instructions are delivered to the mixing instructions circuit;
   wherein the direction of movement instructions, the speed of movement instructions, and the primary actuator movement command are transmitted as four discrete two-state Boolean values (HW_WAY1, HW_WAY2, HW_SPEED1, HW_SPEED2), and are linked by the following relations:

HW_WAY1=WAY1#2;

HW_WAY2=WAY2#2;

HW_SPEED1=SPEED1#2 AND SPEED1#1; and

HW_SPEED2=SPEED2#2 AND SPEED2#1;

wherein:
   WAY1#2 is a discrete value activated by a second calculation chain for delivering a direction of movement instruction in a first direction;
   WAY2#2 is a discrete value activated by a second calculation chain for delivering a direction of movement instruction in a second direction;
   SPEED1#2 is a discrete value activated by a second calculation chain for delivering a speed of movement instruction in a first direction;
   SPEED1#1 is a discrete value activated by a first calculation chain for delivering a speed of movement instruction in a first direction;
   SPEED2#2 is a discrete value activated by a second calculation chain for delivering a speed of movement instruction in a second direction; and
   SPEED2#1 is a discrete value activated by a first calculation chain for delivering a speed of movement instruction in a second direction.

2. The safe control device as claimed in claim 1, wherein, when at least two different direction of movement instructions feed the mixing instructions circuit the mixing instructions circuit delivers a primary command, corresponding to a zero movement, to the power stage.

3. The safe control device as claimed in claim 1, wherein when at least two speed of movement instructions feeding the mixing instructions circuit are different, the mixing instructions circuit delivers a primary command to the power stage, the primary command corresponding to a movement whose speed is the lowest of those assigned by the speed instructions.

4. The safe control device as claimed in claim 1, wherein:
   the power stage comprises a power H bridge and two voltage sources supplying different voltages,
   the power H bridge comprises four relays, the four relays being individually addressable by discrete values, the set of discrete values constituting a primary command, each relay being able to be conducting or non-conducting depending on the discrete value addressing the relay.

5. The safe control device as claimed in claim 1, wherein the actuator is a full authority rotary type actuator.

6. The safe control device as claimed in claim 1, wherein the actuator is a trim actuator which is used for acting on manual piloting means of an aircraft.

* * * * *